J. C. Boyd,
Elastic Hose Tubing,
Nº 25,239.  Patented Aug. 30, 1859.
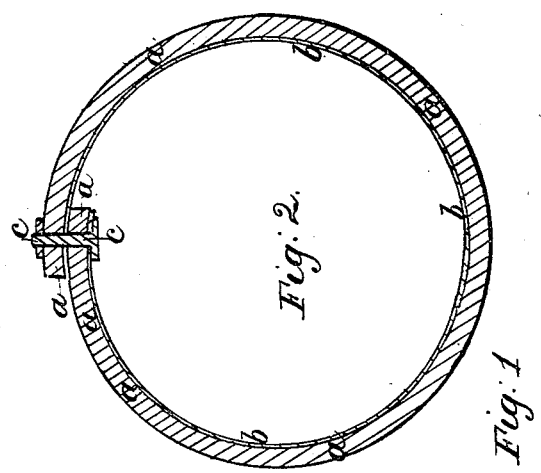
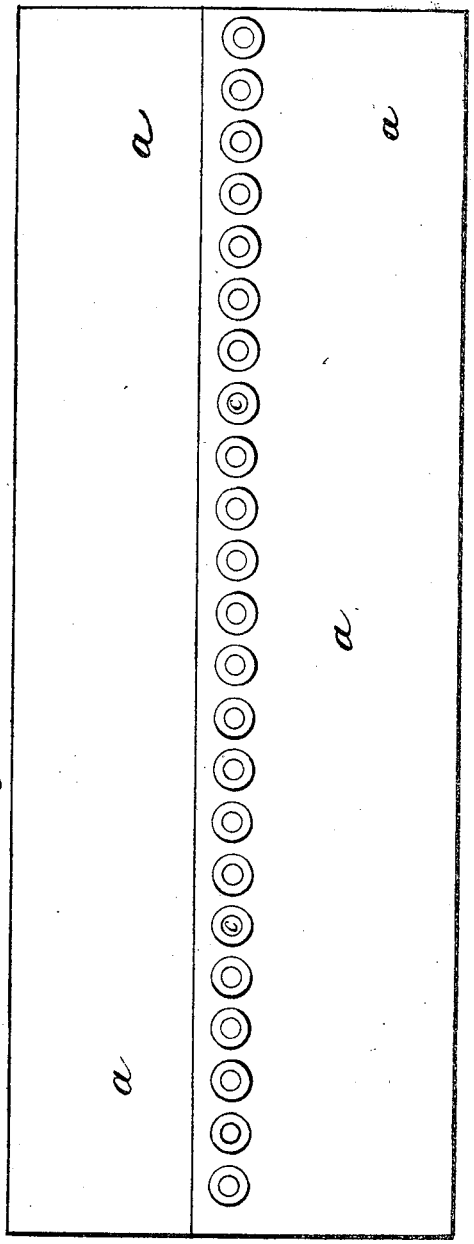
Witnesses;
Joseph Gavett
Albert W. Brown.
Inventor;
John C. Boyd

UNITED STATES PATENT OFFICE.

JOHN C. BOYD, OF BOSTON, MASSACHUSETTS.

ELASTIC HOSE-TUBING.

Specification forming part of Letters Patent No. 25,239, dated August 30, 1859; Reissued January 20, 1874, No. 5,731.

*To all whom it may concern:*

Be it known that I, JOHN C. BOYD, of Boston, in the county of Suffolk and State of Massachusetts, have invented certain new and useful Improvements in the Manufacture of Hose or Flexible Tubes for Conveying Fluids, and that the following description, taken in connection with the accompanying drawings, hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings represent my improvements.

Figure 1 is an elevation of my new hose. Fig. 2 is a transverse vertical section of the same.

It has long been considered desirable to obtain a flexible pipe for conveying fluids, which should answer the purpose as well as leather hose, the great expense of which has proved a serious objection to its use. Rubber hose, as now manufactured, has proved a tolerable substitute for leather hose, but does not possess the durability of the latter, as the fabric between the two sheets of rubber—so placed in the ordinary manufacture of rubber hose—soon becomes rotted by the chemical action of the rubber upon it. The Grenoble hose, so called, which consists of a thick woven fabric of fibrous material, gets saturated on its inside, which is not accessible to the drying action of air and heat and often mildews and rots before it can become dried.

To obtain a hose which shall possess all the durability of leather hose, and yet have the advantages of greater lightness, flexibility, and cheapness, are the objects aimed at and secured by the present invention, which consists in forming the hose of a thick and strong woven fabric of cotton, hemp or other fibrous materials, lined with and fastened to a coating or sheet of india rubber or gutta percha. By this means, while an extremely light, strong, and cheap hose is made, its durability is very great, as the rubber lining not only presents a smooth surface to the passage of fluids through the tube, but also prevents the fabric from being saturated on the inside and consequently from being, in time, deteriorated and destroyed.

$a$ $a$ in the drawings represent the outside or covering of the hose, woven in a three, four or more "ply" as may be desirable, in the ordinary manner, and while in the piece or sheet is fastened, by means of the rubber cement known to rubber manufacturers, to a sheet of india rubber or gutta percha $b$ $b$. This attachment and fastening is effected by passing the woven fabric and the india rubber or gutta percha sheet with the cement between them, through calender rolls, and the rubber or gutta percha sheet is made and vulcanized by the mode commonly practiced in the manufacture of india rubber. The fabric thus constituted of the woven exterior and the water proof lining is then formed into a tube of any desired diameter, and secured by rivets, $c$ $c$, &c., the result being a light, strong, flexible, and cheap hose, and one which is not liable to deterioration or decay.

Having thus described my improvement I wish to have it understood that I do not confine myself to the use of india rubber or gutta percha sheets cemented to the fibrous substance of the hose and vulcanized. The surface of the inner side of the hose may be coated with any kind of waterproof composition whether combined with or free from sulfur, or whether vulcanized or not. But

What I claim as new and desire to have sceured by Letters Patent is—

As a new article of manufacture the hose made of flexible tubes, the same consisting of a woven fabric of cotton, hemp or other fibrous materials, lined with or fastened to a layer or sheet of vulcanized india rubber or gutta percha or of any other waterproof composition, and the whole secured by rivets substantially as described.

JOHN C. BOYD.

Witnesses:
JOSEPH GAVETT,
ALBERT W. BROWN.